April 21, 1970     E. G. SUNDBERG     3,507,698
METHOD FOR THE PRODUCTION OF LEAD STORAGE BATTERY ELECTRODES
Filed April 17, 1969
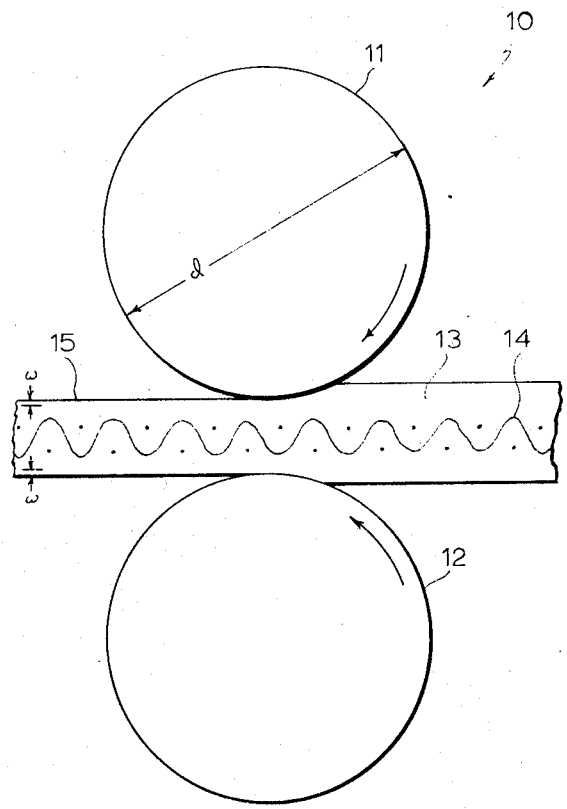
ERIK G. SUNDBERG
*INVENTOR*
BY *Burns, Doane, Benedict, Swecker & Mathis*
*ATTORNEY*

United States Patent Office 3,507,698
Patented Apr. 21, 1970

3,507,698
METHOD FOR THE PRODUCTION OF LEAD STORAGE BATTERY ELECTRODES
Erik Gustav Sundberg, Osbacken, Sweden, assignor to Aktiebolaget Tudor, Stockholm, Sweden, a corporation of Sweden
Continuation-in-part of application Ser. No. 590,223, Oct. 28, 1966. This application Apr. 17, 1969, Ser. No. 816,989
Claims priority, application Sweden, Dec. 28, 1965, 16,809/65
Int. Cl. H01m 35/26, 39/00
U.S. Cl. 136—33    3 Claims

ABSTRACT OF THE DISCLOSURE

A method for the production of a storage battery electrode comprising a grid of metallic material covered with a paste of active compound including lead, lead oxides, sulphuric acid, and water in which the heat treatment consists of passing the electrode between a pair of rollers heated to a temperature of about 500° C. that is sufficiently high to dry only the surface of the paste to a depth of about 0.1 to 0.2 mm.

---

Cross reference to related applications

This application is a continuation-in-part of patent application Ser. No. 590,223 filed Oct. 28, 1966, now abandoned.

The electrodes in a modern lead storage battery consist of a usually cast grid of lead alloy, or other metals, which grid in turn is filled by mechanical means with a so-called active compound, which in turn consists essentially of finely powdered lead, lead oxides, sulfuric acid, and water. Often organic substances are added, lignins, wood flour, soot or the like. After the electrode grid has been pasted, i.e., filled with active compound, they pass according to a known method through a drying zone, whereby the outer layer of the active compound is subjected to radiant heat from open gas flames. A grid of the type referred to is illustrated in U.S. Patent 3,117,893.

The present invention has the purpose of eliminating the disadvantages which are inherently associated with the prior drying process, and the invention is essentially characterized in that the filled electrodes are caused to pass between pairs of rolls heated to a high temperature, which rolls have the purpose, in addition to heat transfer, to exercise a light pressure on the active compound to compress the compound into the interstices of the metallic grid.

By drying the surface of the electrode, the main advantage obtained is that the electrodes can be stacked and pressed together during storage without sticking together. By the heat treatment, which lasts only a short time, the surface is dried only to a depth of 0.1–0.2 mm. In the rest of the electrode compound, the water remains and during the immediately following storage time, a reaction takes place between lead oxide, sulfuric acid and water to form mono or multibasic lead sulfate. The coming into existence of the said lead sulfate is of fundamental importance for the mechanical strength and life expectancy of the finished electrode. Theoretical considerations lead to the supposition, and laboratory tests confirm this supposition, that the residual water in the active material after the drying process determines the amount of sulfate formed and therewith the strength and life expectancy of the electrode.

It is also important that the surface of the electrode is dried sufficiently that the electrode can stand handling and storage without the amount of water in the interior of the electrode being reduced during the drying process. By the methods hitherto used, the filled electrodes have been caused to pass by a row of relatively strong gas flames. In this conventional drying process it is on the base of the above reasoning necessary that the flames be intensive sources of radiation, so only the surface of the electrode is dried. It has, however, been found to be practically impossible to avoid the evaporation of too great an amount of water. Through this evaporation a drying of the interior of the electrode takes place, with attendant crack formation in the paste. The crack formation has a harmful effect on the strength and life expectancy of the electrode. A further disadvantage of drying with open flames manifests itself in that the electrode surfaces are unevenly heated. If the machine in which the filling and drying of the electrodes takes place stops for any reason during the process, a melting of the electrode takes place in the drying zone, whereby melting lead may get on the burner nozzles and cause even longer shutdowns.

Through the present invention, only an extremely thin layer of the electrode surface is dried by the electrode being subjected to a very high temperature for a very short time. This is done by the electrode, immediately after filling with active compound, being caused to pass between intensively heated rolls. These rolls thereby expose the electrode to a certain pressure simultaneously with heat transfer to the surface of the compound taking place. Through this direct contact with heated rolls at a certain temperature, very good heat transfer is obtained and the dried surface layer is kept within the range of 0.1–0.2 mm. The strength of the electrode is further increased by their surface layers being compressed during the passage between the rolls. Finally, the electrodes are given an even thickness, which is of importance if many thin electrodes are to be built into a battery cell. In that case, thickness variations of, for example 0.1 mm., can be of importance.

In a machine for carrying out the method according to the present invention, heated rolls are suitably placed immediately after the paste filling section. The heating of the rolls can be accomplished in different ways without affecting the results of the invention. The rolls can be heated internally as with electricity or heated circulating liquid, and also externally as by radiation from open flames.

Depending on the speed of the active compound filling machine, one or more pairs of rolls are arranged to heat and compress the electrodes. It is important that the heating period is extremely short, so that only a thin surface layer is dried.

Referring now to the single figure of the drawing, there is schematically shown an apparatus 10 suitable for practicing the process of the present invention. The apparatus 10 comprises an upper roller 11 and a lower roller 12. The rollers 11 and 12 are driven in the direction of the arrows by any suitable means not shown. A paste 13 is applied to a grid 14 in a manner well-known to those skilled in this art. The paste-covered grid 14 is then passed between the nip of the rollers 11 and 12 which are maintained at a distance from one another which is less than the thickness of the paste-covered grid, but is greater than the thickness of the grid 14 when finished. The rollers 11 and 12 are maintained at a sufficiently high temperature to achieve the desired surface drying. The heat from the rollers 11, 12 dries the paste 13 to continuously produce a surface-dried electrode 15. The diameter of rollers 11 and 12 is selected to provide the desired rate of feed consistent with being so designed as to maintain the desired operating temperature and to operate at a convenient speed of rotation. Neither the speed of rotation of the rollers 11 and 12 nor their temperature is critical as long as the surface-dried paste-covered electrode 15 is dried from each side to a depth substantially less than one-half of its thickness, and preferably to a depth of 0.1 to 0.2 mm. as pointed out above.

By way of an illustrative example, the diameter of rollers 11 and 12 is 96 mm. and is maintained at about 500° C. or perhaps 525° C. The rollers 11 and 12 are caused to rotate at a peripheral speed of about 16 meters per minute.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for the production of a storage battery electrode comprising heat treating a grid of metallic material covered with a paste of active compound including lead, lead oxides, sulfuric acid, and water in which the heat treatment consists of passing the electrode between a pair of rollers heated to a temperature sufficiently high to dry the surface of the paste to a depth of only about 0.1 to 0.2 mm. said depth being substantially less than one half of the total thickness of the electrode.

2. The method described in claim 1 wherein the rollers compress the paste into the interstices of the grid of metallic material and produce grids having substantially uniform thickness.

3. In a method for the production of a storage battery electrode comprising a grid of metallic material covered with the paste of active compound including lead, lead oxides, sulfuric acid and water by providing a pair of continuously rotating rollers maintained at a temperature of about 500° C. and passing the paste-covered grid between the nip of said pair of continuously rotating rollers to thereby heat the surfaces on each side of said electrode, the diameter of said rollers and the speed of rotation being selected so that as the electrode passes in contact with the rollers at a speed substantially equal to the peripheral speed of the rollers and the electrode is dried on opposite surfaces to a depth of 0.1 to 0.2 mm. said depth being substantially less than one half of the total thickness of the electrode.

References Cited

UNITED STATES PATENTS

| | | | |
|---|---|---|---|
| 484,120 | 10/1892 | Silvey | 136—67 |
| 2,724,734 | 11/1955 | Howard | 136—34 |
| 2,938,063 | 5/1960 | Greenburg et al. | 136—26 |
| 3,067,273 | 12/1962 | Duddy | 136—27 |

WINSTON A. DOUGLAS, Primary Examiner

ANTHONY SKAPARS, Assistant Examiner

U.S. Cl. X.R.

136—27